US009589391B2

(12) United States Patent
Sakuragi

(10) Patent No.: US 9,589,391 B2
(45) Date of Patent: Mar. 7, 2017

(54) THREE DIMENSIONAL ORIENTATION CONFIGURATION APPARATUS, METHOD AND NON-TRANSITORY COMPUTER READABLE MEDIUM

(71) Applicant: FUJIFILM CORPORATION, Minato-ku, Tokyo (JP)

(72) Inventor: Futoshi Sakuragi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 64 days.

(21) Appl. No.: 14/665,037

(22) Filed: Mar. 23, 2015

(65) Prior Publication Data
US 2015/0279120 A1 Oct. 1, 2015

(30) Foreign Application Priority Data

Mar. 28, 2014 (JP) .................................. 2014-067655

(51) Int. Cl.
G06K 9/00 (2006.01)
G06T 19/20 (2011.01)
(Continued)

(52) U.S. Cl.
CPC ............ *G06T 19/20* (2013.01); *G06T 11/005* (2013.01); *G06T 11/008* (2013.01); *G06T 15/20* (2013.01);
(Continued)

(58) Field of Classification Search
CPC ....... G06T 2207/20108; G06T 2215/16; G06T 2219/008
See application file for complete search history.

(56) References Cited

U.S. PATENT DOCUMENTS 5,630,034 A * 5/1997 Oikawa .................. G06T 15/08
345/424
5,680,484 A * 10/1997 Ohyama ............... G06T 11/006
250/201.3
(Continued)

FOREIGN PATENT DOCUMENTS

JP 2005-322257 A 11/2005
JP 2009-22476 A 2/2009

OTHER PUBLICATIONS

Communication, dated Sep. 11, 2015, issued in corresponding EP Application No. 15159669.9, 9 pages.
(Continued)

Primary Examiner — Gandhi Thirugnanam
(74) Attorney, Agent, or Firm — Sughrue Mion, PLLC

(57) ABSTRACT

A projection image of a three dimensional image is generated and displayed and a three dimensional target point corresponding to a designated two-dimensional target point is set to the three dimensional image. A reference cross-section is set to the three dimensional image by using the three dimensional target point. A cross-sectional two-dimensional image of the reference cross-section in which an object close to a point of view that faces the reference cross-section is not displayed is generated. An instruction to change the position of the point of view, using the three dimensional target point based on the cross-sectional two-dimensional image as a reference point, in order to align an observation direction of a structure to which the three dimensional target point is set with a target three dimensional direction is received. A new reference cross-section is set. A new cross-sectional two-dimensional image of the new reference cross-section is generated.

20 Claims, 8 Drawing Sheets

(51) Int. Cl.
  *G06T 11/00* (2006.01)
  *G06T 15/20* (2011.01)
  *G06T 19/00* (2011.01)
(52) U.S. Cl.
  CPC ........ *G06T 19/003* (2013.01); *G06T 2200/04* (2013.01); *G06T 2200/21* (2013.01); *G06T 2207/10081* (2013.01); *G06T 2207/10088* (2013.01); *G06T 2207/20108* (2013.01); *G06T 2207/30101* (2013.01); *G06T 2207/30196* (2013.01); *G06T 2210/41* (2013.01); *G06T 2211/40* (2013.01); *G06T 2215/16* (2013.01); *G06T 2219/008* (2013.01); *G06T 2219/2016* (2013.01)

(56) References Cited

U.S. PATENT DOCUMENTS

| | | | | |
|---|---|---|---|---|
| 5,734,384 | A * | 3/1998 | Yanof | G06T 17/10 345/419 |
| 5,963,211 | A * | 10/1999 | Oikawa | G06T 17/10 345/424 |
| 5,995,108 | A * | 11/1999 | Isobe | G09G 1/06 345/421 |
| 6,169,917 | B1 * | 1/2001 | Masotti | A61B 6/4441 600/407 |
| 6,336,899 | B1 * | 1/2002 | Yamazaki | A61B 8/0833 128/916 |
| 7,463,262 | B2 * | 12/2008 | Ema | G06T 3/0037 345/423 |
| 7,573,039 | B2 * | 8/2009 | Smith | G01T 1/1647 250/370.09 |
| 7,706,589 | B2 * | 4/2010 | Rasche | G06T 7/0075 128/922 |
| 2006/0055711 | A1 * | 3/2006 | Hayakawa | G06T 7/2033 345/629 |
| 2008/0175459 | A1 * | 7/2008 | Geiger | A61B 5/4255 382/131 |
| 2008/0253630 | A1 * | 10/2008 | Masumoto | G06T 19/00 382/128 |
| 2009/0018448 | A1 * | 1/2009 | Seo | A61B 8/14 600/443 |
| 2013/0182079 | A1 * | 7/2013 | Holz | G06T 7/0075 348/47 |
| 2014/0071126 | A1 * | 3/2014 | Barneoud | G06T 19/00 345/420 |
| 2015/0279120 | A1 * | 10/2015 | Sakuragi | G06T 19/20 382/103 |

OTHER PUBLICATIONS

Yuan, F. "Real time multiple planar volume clipping based on the programmable graphics process unit," Optica Applicata, vol. XXXIX, No. 2, Jan. 2009, pp. 331-345, XP002743689.

Kim et al, "Interactive Data-Centric Viewpoint Selection," SPIE, Proceedings of Conference on Visualization and Data Analysis 2012, vol. 8294, Jan. 22, 2012, pp. 829405-1-829405-12, XP002743690.

* cited by examiner

THREE DIMENSIONAL ORIENTATION CONFIGURATION APPARATUS, METHOD AND NON-TRANSITORY COMPUTER READABLE MEDIUM

CROSS-REFERENCE TO RELATED APPLICATIONS

The present application claims priority under 35 U.S.C. §119 to Japanese Patent Application No. 2014-67655, filed on Mar. 28, 2014, all of which are hereby expressly incorporated by reference into the present application.

BACKGROUND OF THE INVENTION

1. Field of the Invention

The present invention relates to a three dimensional orientation configuration apparatus, method and program which set a three dimensional direction in a three dimensional image using a two-dimensional image that is obtained from a three dimensional image based on, for example, a CT image or an MRI image.

2. Description of the Related Art

A process has been performed which displays a three dimensional image acquired by a modality, such as a CT apparatus or an MRI apparatus, as a two-dimensional projection image using, for example, a volume rendering method or a surface rendering method. An operator operates, for example, a mouse on a display screen to change the position of the point of view in the projection image. In this way, it is possible to move, magnify, reduce, or rotate an observation target of the three dimensional image and display the observation target. For example, JP2009-022476A discloses a method which designates a point on a projection image and changes a projection surface, using the designated point as a reference point, to generate projection images viewed in various directions. As such, when the position of the point of view is changed to move, magnify, reduce, or rotate the projection image, it is possible to three dimensionally analyze an observation target. In addition, a method has been proposed which designates a point of interest on a structure included in a three dimensional image, sets an approach direction in the direction of the line of sight that passes through the point of interest, updates the approach direction whenever the projection direction is changed and sets a new approach direction, in order to easily check the three dimensional shape of an area of interest in the projection image (see JP2005-322257A) The use of the method disclosed in JP2005-322257A makes it easy to check the shape of the structure including the point of interest.

SUMMARY OF THE INVENTION

However, it is necessary to track a tubular structure, such as a blood vessel or the trachea, included in a three dimensional object in the extension direction of the structure to observe the state of the structure. It is possible to display a projection image and designate a tracking start point on the projection image, thereby designating a tubular structure tracking start point on a three dimensional image including the tubular structure. However, even though the tubular structure included in the three dimensional image extends in a three dimensional direction in the three dimensional space, only two-dimensional information is present on the projection image and no information is present in the depth direction of the image. Therefore, in the method using the projection image, it is difficult to designate the three dimensional direction and to track the tubular structure. In addition, when another structure overlaps in the extension direction of the tubular structure or when the tubular structure to be tracked is not extracted, it is very difficult to designate the tracking direction. In particular, when the tubular structure is a thin blood vessel, it is difficult to refer to the blood vessel which extends in the depth direction of the projection image. Therefore, it is difficult to designate the three dimensional direction so as to track the structure.

For this reason, the extension direction of the structure is designated as the tracking direction on the cross-sectional image of a cross-section including the tracking start point, instead of the projection image, or the tracking direction is designated as the two-dimensional direction on a projection image which is assumed to have the same depth as the tracking start point. However, only the two-dimensional direction is designated in the two methods. Therefore, there is a concern that the direction in which the tubular structure is not originally present will be designated.

The use of the method disclosed in JP2005-322257A makes it possible to set the approach direction to the object of interest. However, in many cases, a structure which is closer to the point of view in the direction of the line of sight than to a tubular structure of interest in the projection image interferes with the tubular structure and it is difficult to set an appropriate approach direction.

The invention has been made in view of the above-mentioned problems and an object of the invention is to provide a technique which can appropriately set a three dimensional direction in a three dimensional space suitable to observe a three dimensional image, using a two-dimensional image that is obtained from the three dimensional image.

According to an aspect of the invention, there is provided a three dimensional orientation configuration apparatus including: a projection image generation unit that generates a two-dimensional projection image from a three dimensional image indicating a three dimensional object; an input unit that receives the designation of a two-dimensional target point which is a target point on the projection image; a three dimensional target point setting unit that sets a three dimensional target point corresponding to the two-dimensional target point to the three dimensional image; a reference cross-section setting unit that sets a reference cross-section to the three dimensional image on the basis of the three dimensional target point; a cross-sectional two-dimensional image generation unit that generates a cross-sectional two-dimensional image of the reference cross-section in which an object closer to a point of view, the point of view is located on a line that passes through the three dimensional target point and the line is perpendicular to the reference cross-section and the point of view faces the reference cross-section, than to the reference cross-section included in the three dimensional image is not displayed; a display unit that displays the cross-sectional two-dimensional image; and a direction determination unit that generates the projection image, displays the projection image, receives the designation of the two-dimensional target point, sets the three dimensional target point, sets the reference cross-section, generates the cross-sectional two-dimensional image, displays the cross-sectional two-dimensional image, receives an instruction to change the position of a point of view, using the three dimensional target point based on the cross-sectional two-dimensional image as a reference point, in order to align an observation direction of a structure to which the three dimensional target point is set with a target three dimensional direction, sets a new reference cross-section on the basis of the changed position of the point of view, generates a new cross-sectional two-dimensional image of the new reference cross-section, and displays the new cross-sectional two-dimensional image, thereby determining a three dimensional direction for observing the three dimensional image.

The "target three dimensional direction" means a direction in a three dimensional space which is considered by the operator to be suitable for the observation of the structure to which the three dimensional target point is set. For example, in a case in which the three dimensional target point is set to a tubular structure, such as a blood vessel or the trachea, when the tubular structure included in the cross-sectional two-dimensional image is oriented in a direction perpendicular to the displayed cross-sectional two-dimensional image and is suitable for observation, the target three dimensional direction is perpendicular to the reference cross-section from which the cross-sectional two-dimensional image has been generated. In addition, when the tubular structure is oriented in a direction parallel to the displayed cross-sectional two-dimensional image and is suitable for observation, the target three dimensional direction is parallel to the reference cross-section and the tubular structure is oriented in the target three dimensional direction so as to be most suitably observed in the parallel plane. The target three dimensional direction is not limited to the directions perpendicular and parallel to the cross-sectional two-dimensional image, that is, the reference cross-section, and may be set to any direction. Here, when the target three dimensional direction is perpendicular to the reference cross-section, the three dimensional direction for observing the three dimensional image is a direction from the changed position of the point of view to the three dimensional target point.

The "new cross-sectional two-dimensional image of the new reference cross-section" means a cross-sectional two-dimensional image in which an object that is closer to a point of view facing the new reference cross-section, that is, the changed point of view, than to the new reference cross-section included in the three dimensional image is not displayed.

The projection image is created by acquiring each intersection point of a projection surface and a projection line from the point of view to each pixel forming the three dimensional image. Any projection image obtained by projecting the three dimensional image in a predetermined projection direction may be used. For example, the projection image may be images generated by various projection methods, such as a maximum intensity projection (MTP) method and a minimum intensity projection (MinTP) method. In addition, the projection image may be a pseudo-three dimensional image, such as a volume rendering image generated by a volume rendering method or a surface rendering image generated by a surface rendering method. The point of view of the projection image may be located at an infinite distance from the projection surface.

In the three dimensional orientation configuration apparatus according to the above-mentioned aspect of the invention, the three dimensional target point setting unit may set the three dimensional target point in the structure to which the two-dimensional target point is set.

In the three dimensional orientation configuration apparatus according to the above-mentioned aspect of the invention, the cross-sectional two-dimensional image generation unit may generate, as the cross-sectional two-dimensional image, a two-dimensional projection image of the three dimensional image in which the object that is closer to the point of view facing the reference cross-section than to the reference cross-section is not displayed.

In the three dimensional orientation configuration apparatus according to the above-mentioned aspect of the invention, the cross-sectional two-dimensional image generation unit may generate a cross-sectional image in the reference cross-section of the three dimensional image as the cross-sectional two-dimensional image.

In the three dimensional orientation configuration apparatus according to the above-mentioned aspect of the invention, the cross-sectional two-dimensional image generation unit may combine a cross-sectional image in the reference cross-section with a two-dimensional projection image of the three dimensional image in which the object that is closer to the point of view facing the reference cross-section than to the reference cross-section is not displayed to generate the cross-sectional two-dimensional image.

In the three dimensional orientation configuration apparatus according to the above-mentioned aspect of the invention, the cross-sectional two-dimensional image generation unit may generate the cross-sectional two-dimensional image such that the three dimensional target point is located at the center.

In the three dimensional orientation configuration apparatus according to the above-mentioned aspect of the invention, the cross-sectional two-dimensional image generation unit may generate the cross-sectional two-dimensional image of an area in a predetermined range that has the three dimensional target point of the reference cross-section as a reference point.

The three dimensional orientation configuration apparatus according to the above-mentioned aspect of the invention may further include: a coincidence calculation unit that calculates a coincidence between a pixel value on a line that extends from the three dimensional target point in the target three dimensional direction and a pixel value of the three dimensional target point in the three dimensional image and displays the coincidence on the display unit.

In the three dimensional orientation configuration apparatus according to the above-mentioned aspect of the invention, the reference cross-section setting unit may set the reference cross-section for generating an initial cross-sectional two-dimensional image so as to be perpendicular to a line connecting the point of view of the projection image and the three dimensional target point.

In the three dimensional orientation configuration apparatus according to the above-mentioned aspect of the invention, the reference cross-section setting unit may perform principal component analysis for an area including the three dimensional target point in the three dimensional image to estimate a direction in which the structure having the three dimensional target point set thereto is present and may set the reference cross-section on the basis of the estimated direction.

The "setting of the reference cross-section on the basis of the estimated direction" may be setting the reference cross-section such that it passes through the three dimensional target point and is perpendicular to the estimated direction or setting, as the reference cross-section, a cross-section that includes a segment, which passes through the three dimensional target point and extends in the estimated direction, and faces a structure so as to be most suitable for observation in the surface including the segment.

In the three dimensional orientation configuration apparatus according to the above-mentioned aspect of the invention, when the target three dimensional direction is parallel to the reference cross-section, the direction determination unit may set the target three dimensional direction to a desired direction on the reference cross-section.

In the three dimensional orientation configuration apparatus according to the above-mentioned aspect of the invention, when the target three dimensional direction is parallel to the reference cross-section, the direction determination unit may perform the principal component analysis for an area including the three dimensional target point in the reference cross-section of the three dimensional image to estimate the direction in which the structure having the three dimensional target point set thereto is present and may set the target three dimensional direction on the basis of the estimated direction.

In the three dimensional orientation configuration apparatus according to the above-mentioned aspect of the invention, the direction determination unit may receive the instruction to change the position of the point of view and control the reference cross-section setting unit and the cross-sectional two-dimensional image generation unit such that the setting of the new reference cross-section, the generation of the new cross-sectional two-dimensional image, and the display of the new cross-sectional two-dimensional image are repeated, until the observation direction of the structure to which the three dimensional target point is set is aligned with the target three dimensional direction.

According to another aspect of the invention, there is provided a three dimensional orientation configuration method including: generating a two-dimensional projection image from a three dimensional image indicating a three dimensional object; receiving the designation of a two-dimensional target point which is a target point on the projection image; setting a three dimensional target point corresponding to the two-dimensional target point to the three dimensional image; setting a reference cross-section to the three dimensional image on the basis of the three dimensional target point; generating a cross-sectional two-dimensional image of the reference cross-section in which an object closer to a point of view, which is located on a line that passes through the three dimensional target point and is perpendicular to the reference cross-section and faces the reference cross-section, than to the reference cross-section included in the three dimensional image is not displayed; displaying the cross-sectional two-dimensional image on the display unit; receiving an instruction to change the position of the point of view, using the three dimensional target point based on the cross-sectional two-dimensional image as a reference point, in order to align an observation direction of a structure to which the three dimensional target point is set with a target three dimensional direction; setting a new reference cross-section on the basis of the changed position of the point of view; generating a new cross-sectional two-dimensional image of the new reference cross-section; and displaying the new cross-sectional two-dimensional image to determine a three dimensional direction for observing the three dimensional image.

According to yet another aspect of the invention, there is provided a program that causes a computer to perform the three dimensional orientation configuration method according to the above-mentioned aspect of the invention.

According to the above-mentioned aspects of the invention, a two-dimensional projection image is generated from a three dimensional image. The designation of a two-dimensional target point on the displayed projection image is received. A three dimensional target point corresponding to the two-dimensional target point is set to the three dimensional image. A reference cross-section is set to the three dimensional image on the basis of the three dimensional target point. A cross-sectional two-dimensional image of the reference cross-section in which an object closer to a point of view, which is located on a line that passes through the three dimensional target point and is perpendicular to the reference cross-section and faces the reference cross-section, than to the reference cross-section included in the three dimensional image is not displayed, is generated and displayed. Then, an instruction to change the position of the point of view, using the three dimensional target point based on the cross-sectional two-dimensional image as a reference point, in order to align an observation direction of a structure to which the three dimensional target point is set with a target three dimensional direction is received. A new reference cross-section is set on the basis of the changed position of the point of view. A new cross-sectional two-dimensional image of the new reference cross-section is generated. The new cross-sectional two-dimensional image is displayed. A direction from the changed position of the point of view to the three dimensional target point is determined as a three dimensional direction for observing the three dimensional image. According to this structure, the direction of the structure to which the three dimensional target point is set is changed only by changing the position of the point of view of the displayed cross-sectional two-dimensional image. Therefore, it is possible to set the three dimensional direction for observing the three dimensional image, using only the two-dimensional image obtained from the three dimensional image. In addition, in the cross-sectional two-dimensional image, the object that is closer to the point of view facing a reference point than to the reference cross-section included in the three dimensional image is not displayed. Therefore, the cross-sectional two-dimensional image does not interfere with the structure close to the point of view and it is possible to check the structure included in the cross-sectional two-dimensional image. As a result, it is possible to accurately set the three dimensional direction for observing the three dimensional image.

DESCRIPTION OF THE PREFERRED EMBODIMENTS

Figure 1:
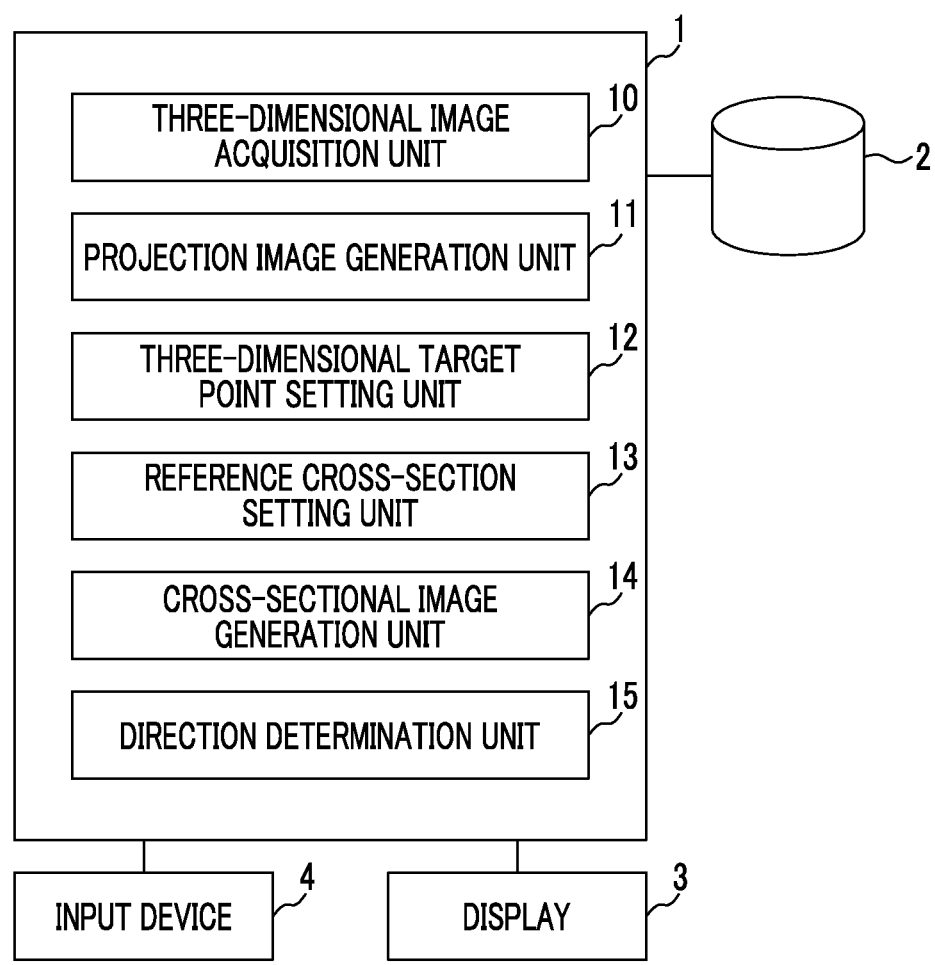
FIG. 1 is a schematic block diagram illustrating the structure of a three dimensional orientation configuration apparatus according to an embodiment.

Hereinafter, an embodiment of the invention will be described with reference to the drawings. FIG. 1 is a schematic block diagram illustrating the structure of a three dimensional orientation configuration apparatus according to this embodiment which is implemented by a three dimensional direction setting program installed in a workstation that is used by a doctor. The three dimensional orientation configuration apparatus 1 includes a processor (not shown), a memory (not shown), and a storage 2, such as a hard disk drive (HDD) or a solid state drive (SSD), as components of a standard workstation. In addition, a display 3 and an input device 4 including, for example, a mouse and a keyboard are connected to the three dimensional orientation configuration apparatus 1.

Data which is referred to by the three dimensional direction setting program is stored in the storage 2 when the program is installed and is loaded to the memory when the program starts up. The three dimensional direction setting program causes the processor to perform a three dimensional image acquisition process, a projection image generation process, a three dimensional target point setting process, a reference cross-section setting process, a cross-sectional two-dimensional image generation process, and a direction determination process.

When the processor performs the above-mentioned processes according to the regulations of the program, the general-purpose workstation functions as a three dimensional image acquisition unit 10 that acquires a three dimensional image to be observed, a projection image generation unit 11 that generates a two-dimensional projection image from the three dimensional image, a three dimensional target point setting unit 12 that sets a target point on the three dimensional image corresponding to a two-dimensional target point, which is a target point set on the projection image, as a three dimensional target point, a reference cross-section setting unit 13 that sets a reference cross-section on the basis of the three dimensional target point, a cross-sectional image generation unit 14 that generates a two-dimensional image of the reference cross-section, and a direction determination unit 15 that determines a three dimensional direction for observing the three dimensional image. In addition, the functions of the above-mentioned units may be distributed to a plurality of processors.

The three dimensional image acquisition unit 10 has a communication interface function of acquiring a three dimensional image V0 from a captured image of a photographic subject in a modality (not shown) such as a multi-slice CT apparatus or an MRI apparatus. In this embodiment, the modality is the multi-slice CT apparatus and the three dimensional image V0 acquired by the modality is stored in an image database (not shown). The three dimensional image acquisition unit 10 acquires the three dimensional image V0 from the image database and stores the three dimensional image V0 in the storage 2.

The three dimensional image V0 is acquired by laminating two-dimensional tomographic images of a part of the photographic subject to be diagnosed, which are sequentially obtained along a direction perpendicular to a tomographic plane. In this embodiment, the three dimensional image V0 is generated by superimposing a plurality of tomographic images captured by the modality. The three dimensional image acquired by the CT apparatus is data which is obtained by storing the absorbed amount of X-rays for each voxel (that is, the position of each pixel) forming grid points on a three dimensional space and in which one signal value (a CT value indicating the absorbed amount of X-rays when the image is captured by the CT apparatus) is given to the position of each pixel.

Figure 2:
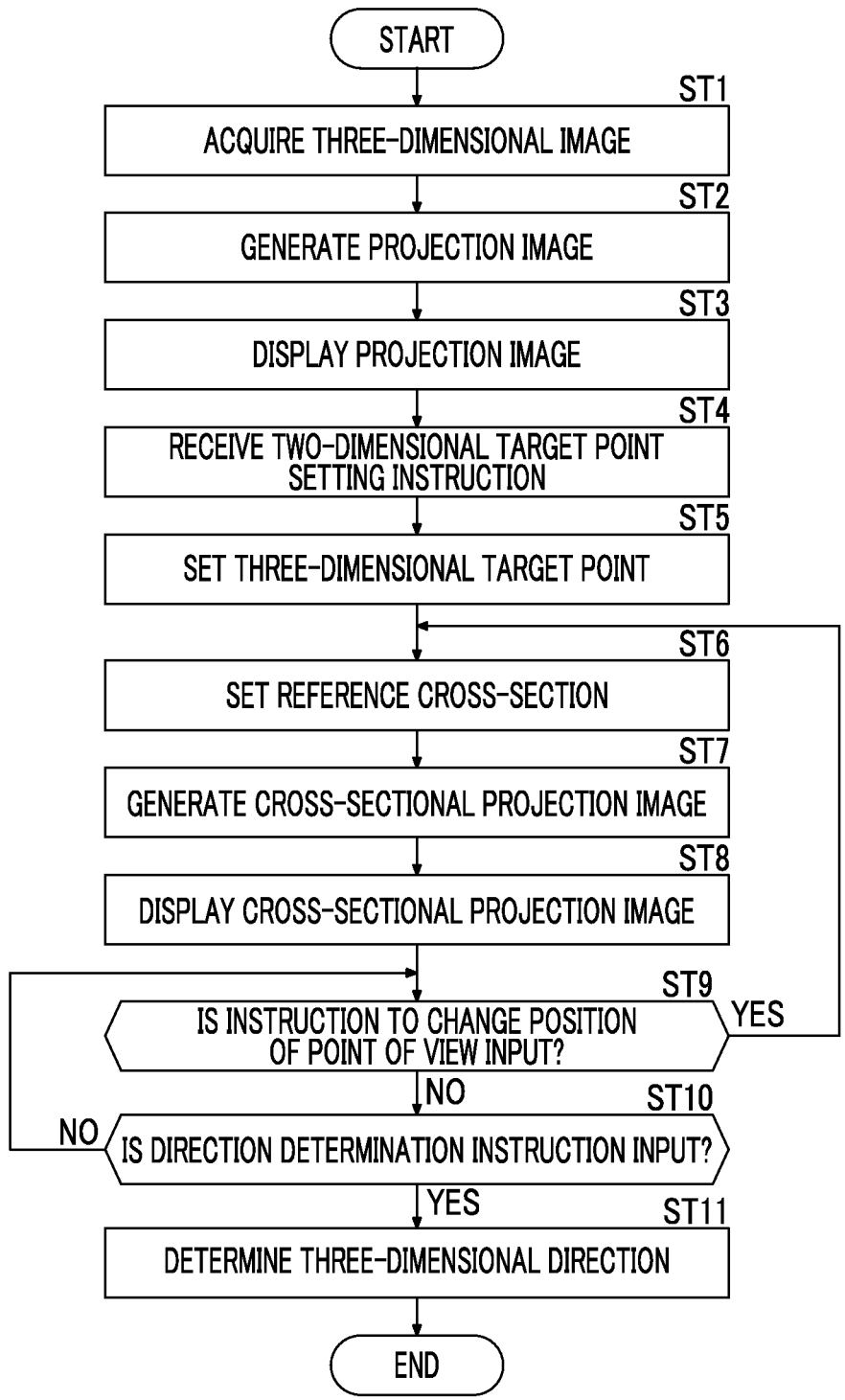
FIG. 2 is a flowchart illustrating a process performed in this embodiment.

Next, a process performed in this embodiment will be described. FIG. 2 is a flowchart illustrating the process performed in this embodiment. First, the projection image generation unit 11 acquires the three dimensional image V0 from the storage 2 (Step ST1) and projects the three dimensional image V0 from the point of view which is disposed at a predetermined position to generate a two-dimensional projection image P0 (Step ST2). In this embodiment, the projection image generation unit 11 generates a volume rendering image as the projection image P0 using a known volume rendering method. The projection image P0 is not limited to the volume rendering image and may be a surface rendering image generated by a surface rendering method, an MIP image generated by an MIP method, and a MinIP image generated by a MinIP method. The generated projection image P0 is displayed on the display 3 (Step ST3).

The operator operates the input device 4 to move, magnify, reduce, and rotate the displayed projection image P0, to display a desired structure in the three dimensional image V0 on the display 3, and to set a target point on the desired structure. The target point is set on the two-dimensional projection image P0. Therefore, in the following description, the target point is referred to as a two-dimensional target point. The apparatus 1 receives an instruction to set the two-dimensional target point (Step ST4). The two-dimensional target point is set as follows. The operator moves a pointer to the target point on the projection image P0 displayed on the display 3 and uses the input device 4 to input a target point setting instruction.

Figure 3:
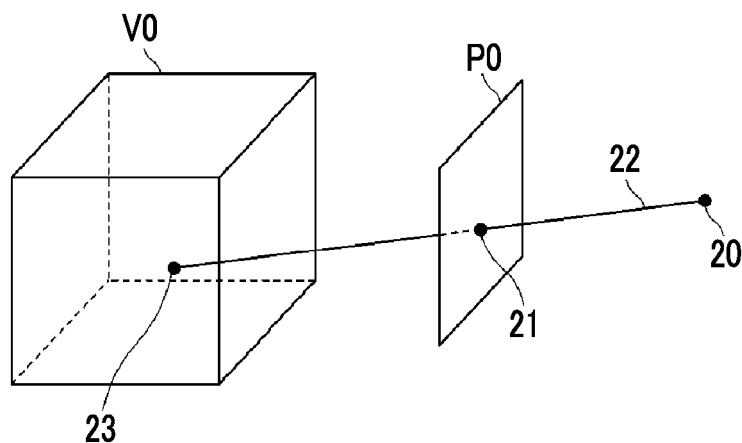
FIG. 3 is a diagram illustrating the setting of a three dimensional target point.

Then, the three dimensional target point setting unit 12 sets, as the three dimensional target point, a target point on the three dimensional image V0 which corresponds to the two-dimensional target point set to the projection image P0 (Step ST5). FIG. 3 is a diagram illustrating the setting of the three dimensional target point. As shown in FIG. 3, the three dimensional target point setting unit 12 sets, as a three dimensional target point 23, an intersection point of a three dimensional structure included in the three dimensional image V0 and a projection line 22 which extends from a point of view 20 when the projection image P0 is generated to a two-dimensional target point 21 set to the projection image P0. In this embodiment, since the projection image P0 is a volume rendering image, the three dimensional target point setting unit 12 integrates the opacity of pixels on the projection line 22 in the three dimensional image V0 from the point of view 20 and sets a pixel, which has an integrated value greater than a predetermined threshold value Th1, on the projection line 22 as the three dimensional target point 23.

When the projection image P0 is a surface rendering image, the three dimensional target point 23 is a point, which intersects the projection line 22 first, on the three dimensional structure in the three dimensional image V0. When the projection image P0 is an MIP image, the three dimensional target point 23 is a point with the maximum signal value on the projection line 22. When the projection image P0 is a MinIP image, the three dimensional target point 23 is a point with the minimum signal value on the projection line 22.

The three dimensional target point setting unit 12 may set the three dimensional target point 23 in the structure, to which the two-dimensional target point 21 is set, in the three dimensional image V0. Specifically, the three dimensional target point setting unit 12 may set, as the three dimensional target point 23, a point that is disposed on the side opposite to the point of view 20 and is a predetermined distance away from the intersection point of the projection line 22 and the three dimensional structure. For example, when the three dimensional structure is a tubular structure, such as a blood vessel or the trachea, the radius of the tubular structure is assumed and a point that is disposed on the side opposite to the point of view 20 and is a distance corresponding to the radius of the tubular structure from the intersection point may be set as the three dimensional target point 23. Then, the three dimensional target point 23 is located in the tubular structure to which the two-dimensional target point 21 is set. The radius of the tubular structure may be a value which is set for each structure in advance or a value which is calculated by analyzing the projection image P0. In addition, the radius may be a value which is manually determined by the operator.

Figure 4:
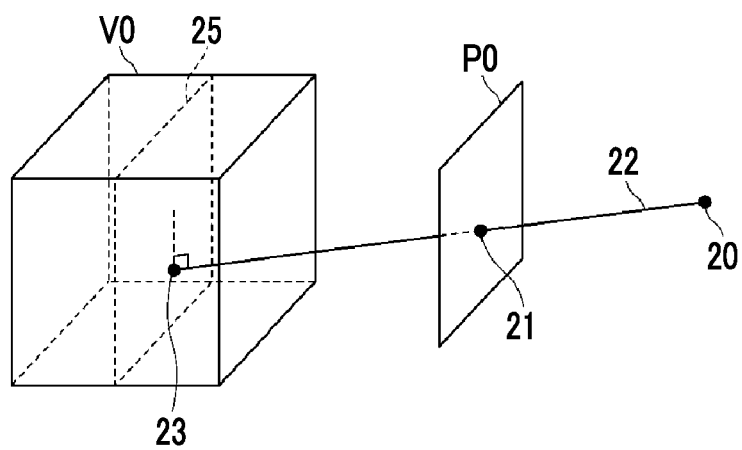
FIG. 4 is a diagram illustrating the setting of a reference cross-section.

Then, the reference cross-section setting unit 13 sets a reference cross-section based on the three dimensional target point 23 to the three dimensional image V0 (Step ST6). FIG. 4 is a diagram illustrating the reference cross-section. In this embodiment, the reference cross-section setting unit 13 sets, as an initial reference cross-section 25, a cross-section which includes the three dimensional target point 23 and is perpendicular to the projection line 22 passing through the three dimensional target point 23 from the point of view 20 at which the projection image P0 has been generated. Then, the cross-sectional image generation unit 14 generates a projection image in which an object that is closer to the point of view 20 than to the reference cross-section 25 in the three dimensional image V0 is not displayed (Step ST7). In the following description, the projection image is referred to as a cross-sectional projection image P1 since it is a projection image of the reference cross-section 25.

Figure 5:
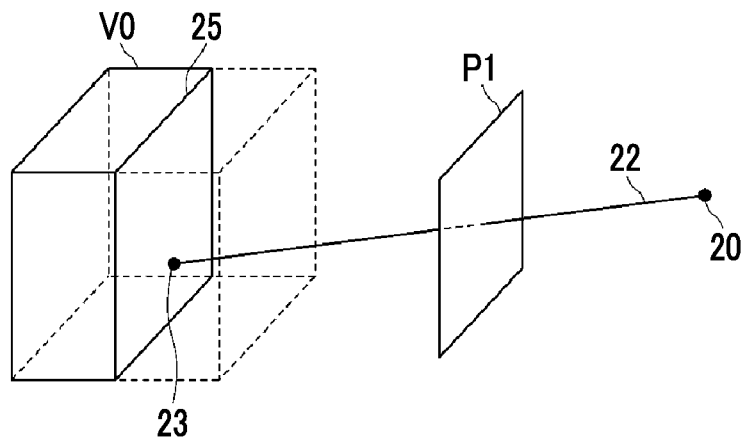
FIG. 5 is a diagram illustrating the generation of a cross-sectional projection image.
Figure 6:
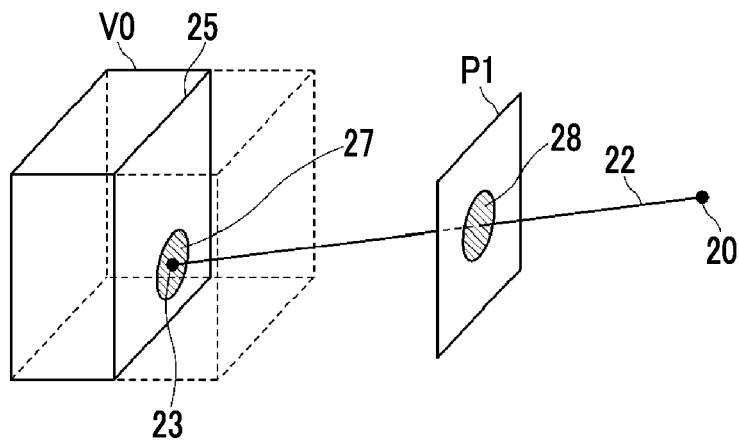
FIG. 6 is a diagram illustrating another example of the generation of the cross-sectional projection image.

FIG. 5 is a diagram illustrating the generation of the cross-sectional projection image. As shown in FIG. 5, the cross-sectional image generation unit 14 does not display the object that is closer to the point of view 20 than to the reference cross-section 25 in the three dimensional image V0. In FIG. 5, the non-displayed state is represented by a dashed line. The three dimensional image V0 in which the object closer to the point of view 20 than to the reference cross-section 25 is not displayed is projected from the point of view 20 to generate the cross-sectional projection image P1. At that time, the cross-sectional projection image P1 is generated such that the three dimensional target point 23 of the reference cross-section 25 is located at the center of the cross-sectional projection image P1. The center of the cross-sectional projection image P1 is an intersection point of the diagonal lines of the cross-sectional projection image P1. The position of the projection surface may be the same as or different from that of the projection image P0. As shown in FIG. 6, the cross-sectional projection image P1 of only the object in a specific range 27 which has the three dimensional target point 23 of the reference cross-section 25 as its center in the three dimensional image V0 may be generated. In this case, only a projection image 28 corresponding to the object in the specific range 27 is included in the cross-sectional projection image P1. The cross-sectional projection image P1 is displayed on the display 3 (Step ST8).

Figure 7:
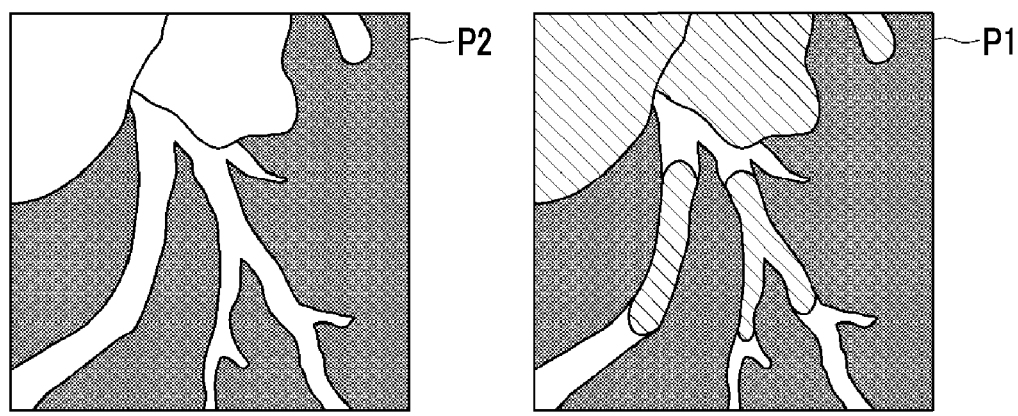
FIG. 7 is a diagram illustrating still another example of the generation of the cross-sectional projection image.

In this embodiment, a cross-sectional image of the reference cross-section 25 may be used, instead of the cross-sectional projection image P1. In addition, the cross-sectional image of the reference cross-section 25 may be combined with the projection image of the three dimensional image V0 in which the object closer to the point of view 20 than to the reference cross-section 25 is not displayed to generate the cross-sectional projection image P1. FIG. 7 is a diagram illustrating the cross-sectional projection images before and after the cross-sectional image of the reference cross-section 25 is combined. As shown in FIG. 7, in the projection image before the image combination, it is possible to view the heart and the blood vessels on the surface of the heart. When the cross-sectional image of the reference cross-section 25 is combined with the projection image, an area which is present in the reference cross-section 25 in the projection image P2 before the image combination is displayed in monochrome since the cross-sectional image is a monochrome image represented by a CT value. In FIG. 7, the monochrome area is hatched. The generation of the cross-sectional projection image P1 makes it possible to easily recognize a portion on the reference cross-section 25 in the cross-sectional projection image P1.

The operator operates the input device 4 to change the position of the point of view such that the observation direction of the structure, to which the three dimensional target point 23 is set, is aligned with a target direction, that is, a target three dimensional direction in the cross-sectional projection image P1. Therefore, the direction determination unit 15 determines whether an instruction to change the position of the point of view is input by the operator (Step ST9).

The target three dimensional direction means a direction in a three dimensional space which is considered by the operator to be suitable for the observation of the structure, to which the three dimensional target point 23 is set, in the three dimensional image V0. For example, in a case in which the three dimensional target point 23 is set to a tubular structure, such as the blood vessel or the trachea, when the extension direction of the tubular structure included in the cross-sectional projection image P1 is aligned with a direction perpendicular to the currently displayed cross-sectional projection image P1, that is, a direction perpendicular to the display surface of the display 3 and is suitable for observation, the target three dimensional direction is perpendicular to the reference cross-section 25 from which the cross-sectional projection image P1 has been generated. In addition, when the extension direction of the tubular structure included in the cross-sectional projection image P1 is aligned with a direction parallel to the currently displayed cross-sectional projection image P1 and is suitable for observation, the target three dimensional direction is parallel to the reference cross-section 25 from which the cross-sectional projection image P1 has been generated. In this embodiment, the direction perpendicular to the reference cross-section 25 is referred to as the target three dimensional direction.

When the determination result in Step ST9 is "Yes", the direction determination unit 15 instructs the reference cross-section setting unit 13 and the cross-sectional image generation unit 14 to change the position of the point of view and to repeatedly perform the process from Step ST6 to Step ST8. Then, the reference cross-section setting unit 13 sets, as a new reference cross-section 25, a cross-section which is perpendicular to a new projection line extending from the changed position of the point of view to the three dimensional target point 23. Therefore, the rotation of the reference cross-section 25 due to the change in the position of the point of view is made about the three dimensional target point 23. The operator may perform, for example, the operations of moving, magnifying, and reducing the cross-sectional projection image P1 in addition to the rotation. These operations are also included in the change in the position of the point of view. The cross-sectional image generation unit 14 generates a new cross-sectional projection image P1 of a new reference cross-section 25 in which an object that is closer to the point of view facing the new reference cross-section 25, that is, the changed point of view than to the new reference cross-section 25 is not displayed and displays the new cross-sectional projection image P1 on the display 3.

The operator observes the cross-sectional projection image P1 and repeatedly issues the instruction to change the position of the point of view until the observation direction of the structure to which the three dimensional target point 23 is set is aligned with the target three dimensional direction. When the observation direction of the structure to which the three dimensional target point 23 is set is aligned with the target three dimensional direction, the operator stops the issue of the instruction to change the position of the point of view (Step ST9: No) and uses the input device 4 to input a direction determination instruction. Then, the direction determination unit 15 determines whether the direction determination instruction is input (Step ST10). When the determination result in Step ST10 is "No", the process returns to Step ST9. When the determination result in Step ST10 is "Yes", the direction determination unit 15 determines a three dimensional direction for observing the three dimensional image V0 (Step ST11) and the process ends. In this embodiment, since the target three dimensional direction is perpendicular to the reference cross-section 25, the three dimensional direction for observing the three dimensional image V0 is a direction in a three dimensional space which extends from the current position of the point of view to the three dimensional target point 23.

Figure 8:
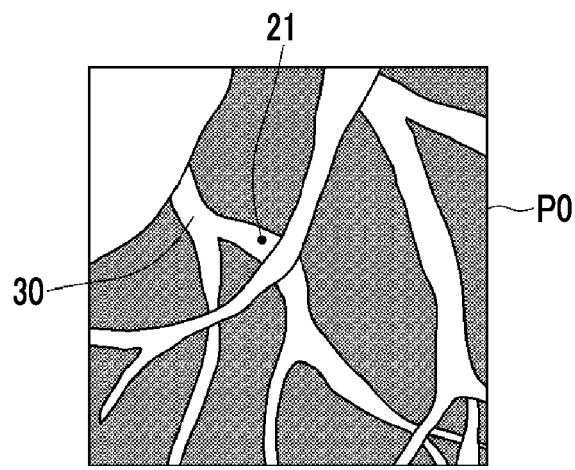
FIG. 8 is a diagram illustrating a projection image which is displayed first in the process according to this embodiment.

Next, the image displayed on the display 3 in this embodiment will be described. FIG. 8 is a diagram illustrating the projection image which is displayed first in the process according to this embodiment. As shown in FIG. 8, the operator sets the two-dimensional target point 21 to the projection image P0 displayed on the display 3. FIG. 8 shows a state in which the two-dimensional target point 21 is set to a blood vessel 30 which is viewed in the projection image P0. When the observation direction of the blood vessel 30 to which the three dimensional target point 23 is set is the extension direction of the blood vessel 30 and the target three dimensional direction is perpendicular to the reference cross-section 25, the operator changes the position of the point of view of the cross-sectional projection image P1 in the cross-sectional projection image P1 displayed on the display 3 such that the extension direction of the blood vessel 30 is perpendicular to the display 3.

Figure 9:
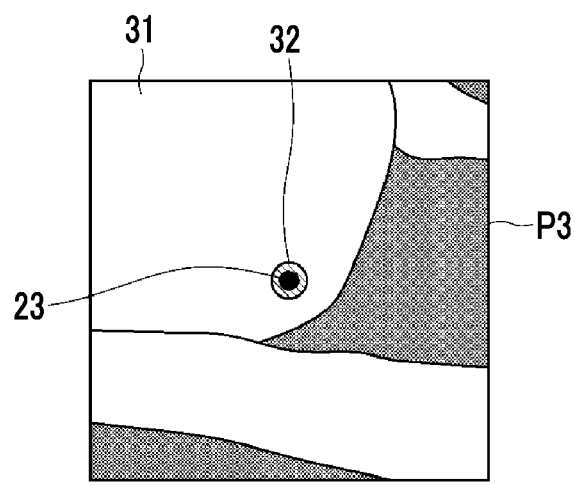
FIG. 9 is a diagram illustrating a projection image for comparison with the cross-sectional projection image generated in this embodiment.

As such, when the position of the point of view is changed and the object closer to the point of view than to the three dimensional target point 23 is included in the projection image, an object 31 which is arranged close to the point of view interferes with the blood vessel 30 and it is difficult to check the blood vessel 30 to which the three dimensional target point 23 is set in the projection image (referred to as a projection image P3), as shown in FIG. 9. In FIG. 9, a slice image of the reference cross-section 25 is combined with the projection image P3. Therefore, the slice image of the reference cross-section 25 is combined at a position corresponding to the three dimensional target point 23. In this embodiment, the position of the point of view is changed such that the blood vessel 30 is perpendicular to the display 3. Therefore, an image showing the cross-section of the blood vessel 30 is included in the slice image of the reference cross-section 25. Therefore, a slice image 32 of the blood vessel 30 can be viewed at the position of the three dimensional target point 23 in the projection image shown in FIG. 9.

Figure 10:
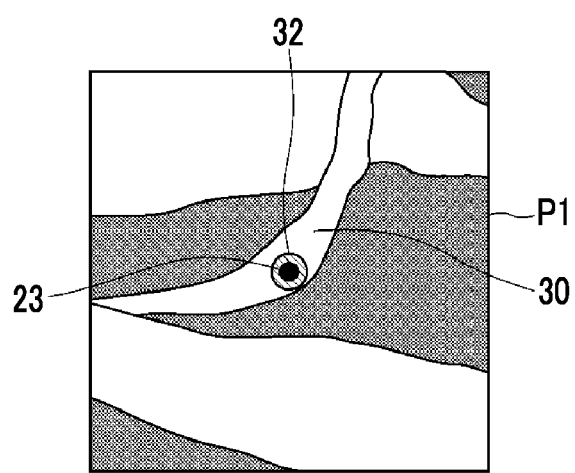
FIG. 10 is a diagram illustrating the cross-sectional projection image generated in this embodiment.

In this embodiment, when the cross-sectional projection image P1 is generated, the object which is closer to the changed point of view than to the reference cross-section 25 in the three dimensional image V0 is not displayed. Therefore, as shown in FIG. 10, the object 31 which is viewed in the projection image P3 shown in FIG. 9 is not included in the cross-sectional projection image P1 and the blood vessel 30 to which the three dimensional target point 23 is set can be viewed. In FIG. 10, since the slice image of the reference cross-section 25 is combined with the cross-sectional projection image P1, the slice image 32 of the blood vessel 30 can be viewed at the position of the three dimensional target point 23.

As such, in this embodiment, the position of the point of view of the displayed cross-sectional projection image P1 is changed to change the direction of the structure to which the three dimensional target point 23 is set. Therefore, it is possible to set the three dimensional direction in which the three dimensional image V0 is observed, using only the two-dimensional image obtained from the three dimensional image V0. In addition, in the cross-sectional projection image P1, the object which is closer to the point of view facing a reference point than to the reference cross-section 25 included in the three dimensional image V0 is not displayed. Therefore, it is possible to check the structure included in the cross-sectional projection image P1 without being disrupted by the structure close to the point of view. As a result, it is possible to accurately set the three dimensional direction in which the three dimensional image V0 is observed.

Figure 11:
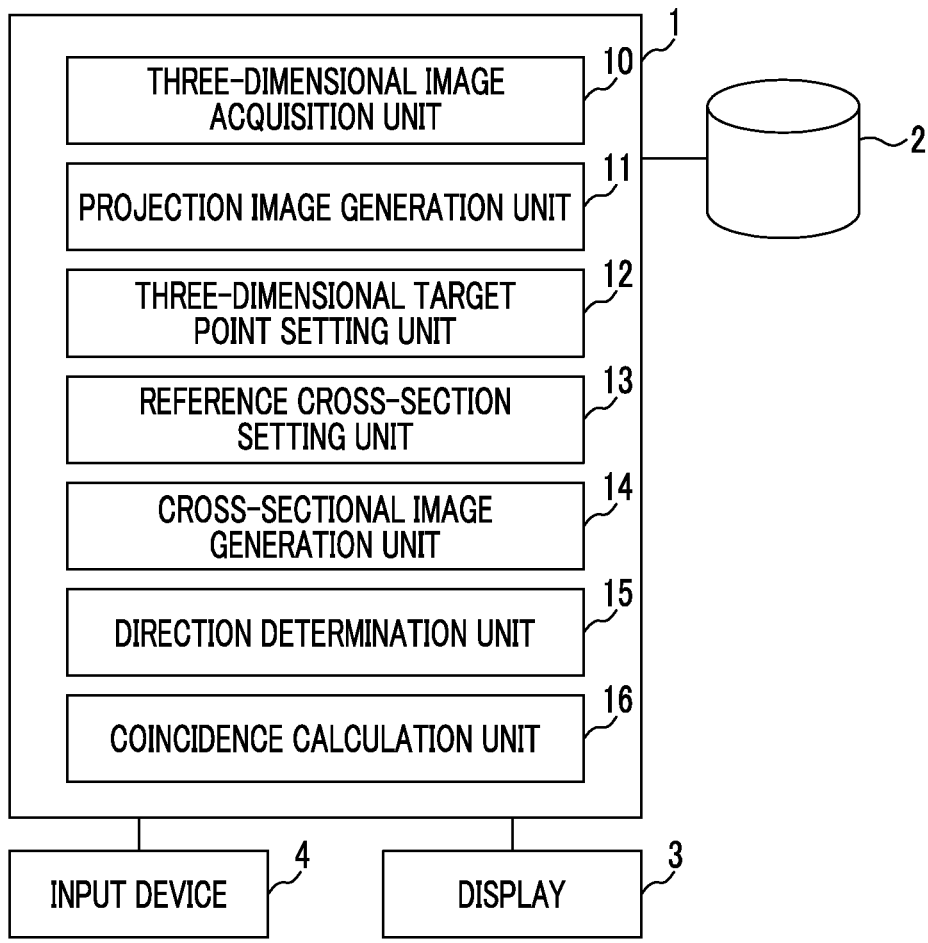
FIG. 11 is a schematic block diagram illustrating the structure of a three dimensional orientation configuration apparatus according to another embodiment.
Figure 12:
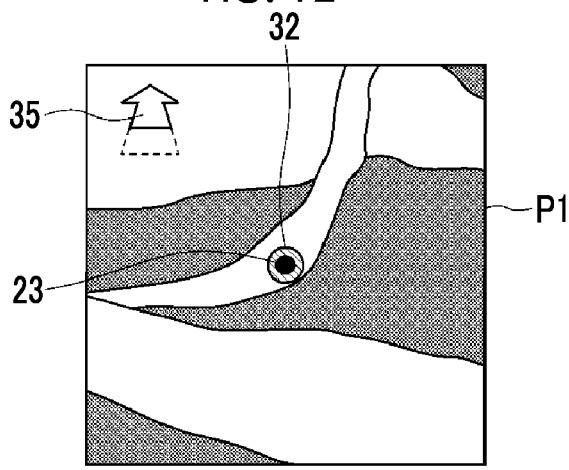
FIG. 12 is a diagram illustrating a cross-sectional projection image on which coincidence is displayed.

In the above-described embodiment, as shown in FIG. 11, a coincidence calculation unit 16 may be provided which calculates the coincidence between the pixel value (CT value) of the three dimensional target point 23 in the three dimensional image V0 and a pixel value on a line extending from the three dimensional target point 23 in the target three dimensional direction and the coincidence calculated by the coincidence calculation unit 16 may be displayed on the cross-sectional projection image P1. FIG. 12 is a diagram illustrating the cross-sectional projection image P1 on which the coincidence is displayed. As shown in FIG. 12, an arrow 35 indicating the target three dimensional direction is displayed on the cross-sectional projection image P1. The length of the arrow 35 is changed according to the coincidence. Specifically, as the coincidence increases, the length of the arrow 35 is reduced. In the state shown in FIG. 12, when the coincidence is reduced, the length of the arrow 35 is increased by a value indicated by a dashed line. In addition, instead of the length, the concentration or color of the arrow may be changed according to the coincidence or a value indicating the coincidence may be displayed.

In addition, for example, the average values of a plurality of pixel values on a line which extends from the three dimensional target point 23 in the target three dimensional direction may be used as the pixel value on the line which extends from the three dimensional target point 23 in the target three dimensional direction. For example, the ratio of a pixel value A1 of the three dimensional target point 23 to the average value A2 of a plurality of pixel values on the line extending from the three dimensional target point 23 in the target three dimensional direction or the absolute value of the difference between the pixel value A1 and the average value A2 can be used as the coincidence. When the coincidence is the ratio, the direction of the three dimensional image V0 which is being displayed becomes closer to the target three dimensional direction as the coincidence becomes closer to 1. When the coincidence is the absolute value of the difference, the direction of the three dimensional image V0 which is being displayed becomes closer to the target three dimensional direction as the coincidence becomes closer to 0. As such, when the coincidence is displayed, the operator can easily recognize the degree of coincidence between the extension direction of the structure to which the three dimensional target point is set and the target three dimensional direction. Therefore, it is possible to effectively perform an operation of determining the three dimensional direction of the three dimensional image V0.

In the above-described embodiment, the reference cross-section setting unit 13 sets, as the reference cross-section 25, the cross-section which includes the three dimensional target point 23 and is perpendicular to the projection line 22 extending from the point of view 20 to the three dimensional target point 23. However, three dimensional principal component analysis may be performed in a region in the vicinity of the three dimensional target point 23 in the three dimensional image V0 to estimate the direction in which the structure having the three dimensional target point 23 set thereto is present, for example, the extension direction of the structure in this embodiment and a cross-section which includes the three dimensional target point 23 and is perpendicular to the estimated direction may be set as the reference cross-section 25.

For example, a method which calculates the eigenvalues of a 3×3 Hessian matrix for each local area of the structure having the three dimensional target point 23 set thereto is used as the principal component analysis method. Here, in an area including a linear structure, one of the three eigenvalues of the Hessian matrix is close to 0 and the remaining two values are relatively large values. In addition, an eigenvector which corresponds to the eigenvalue close to 0 indicates the direction of the main axis of the linear structure. In this embodiment, the direction of the eigenvector is the direction in which the structure having the three dimensional target point 23 set thereto is present.

Figure 13:
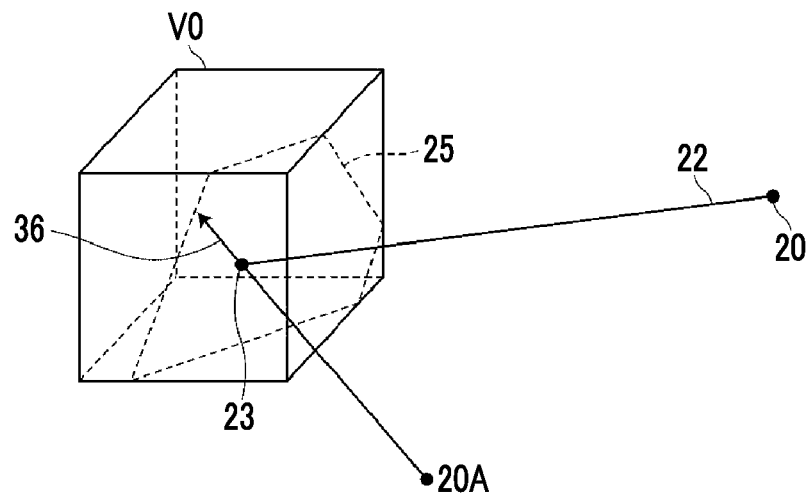
FIG. 13 is a diagram illustrating the setting of a cross-section, which is perpendicular to a direction estimated by principal component analysis, to the reference cross-section.

FIG. 13 is a diagram illustrating the setting of the cross-section perpendicular to the direction which is estimated by the principal component analysis to the reference cross-section. As shown in FIG. 13, when the direction in which the structure having the three dimensional target point 23 set thereto is present, which is estimated by the three dimensional principal component analysis, is a direction indicated by an arrow 36, the reference cross-section setting unit 13 sets, as the reference cross-section 25, a cross-section which includes the three dimensional target point 23 and is perpendicular to the arrow 36. In this case, as shown in FIG. 13, a point of view 20A for generating the cross-sectional projection image P1 is located on a line which passes through the three dimensional target point 23 and is perpendicular to the reference cross-section 25 that is set by the principal component analysis. For comparison, FIG. 13 also shows the projection line 22 from the initial projection start point 20.

As such, since the cross-section which is perpendicular to the direction estimated by the principal component analysis is set as the reference cross-section 25, the structure to which the three dimensional target point 23 is set is oriented in the target three dimensional direction or a direction close to the three dimensional direction in the cross-sectional projection image P1. Therefore, it is possible to effectively perform an operation of aligning the observation direction of the structure to which the three dimensional target point 23 is set with the target three dimensional direction.

Figure 14:
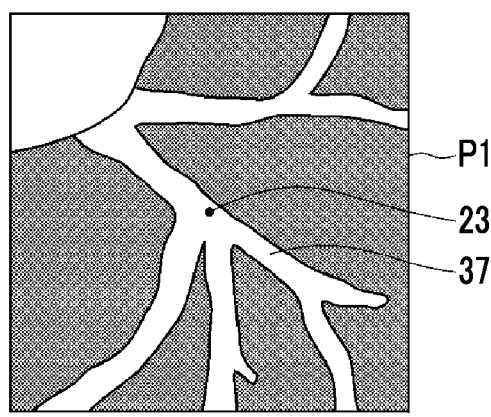
FIG. 14 is a diagram illustrating a cross-sectional projection image in which the blood vessel extends in a direction parallel to the reference cross-section.
Figure 15:
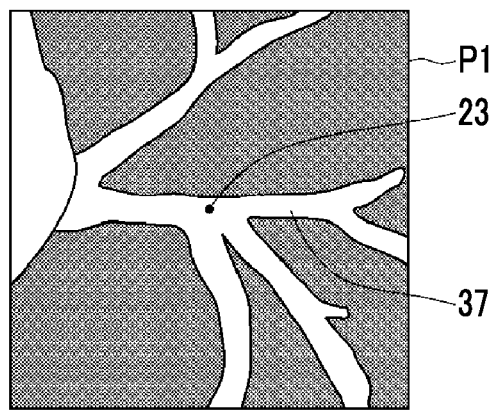
FIG. 15 is a diagram illustrating a state in which the cross-sectional projection image is rotated about the three dimensional target point.

In the above-described embodiment, the direction perpendicular to the reference cross-section 25 is the target three dimensional direction. However, a direction parallel to the reference cross-section 25 may be the target three dimensional direction. In this case, when the structure to which the three dimensional target point 23 is set is the blood vessel, the cross-sectional projection image P1 including a blood vessel 37 which extends in parallel to a screen is displayed on the display 3, as shown in FIG. 14. In the cross-sectional projection image P1, the blood vessel 37 extends in parallel to a display surface of the display 3, but the direction of the blood vessel 37 on the display surface is not determined. Therefore, it is preferable to operate the input device 4 to two-dimensionally rotate the cross-sectional projection image P1 about the three dimensional target point 23. In this case, as shown in FIG. 15, the blood vessel 37 to which the three dimensional target point 23 is set can be oriented in the target three dimensional direction (here, the direction horizontal to the display screen). Therefore, it is possible to align the observation direction of the blood vessel 37 with the target three dimensional direction.

Figure 16:
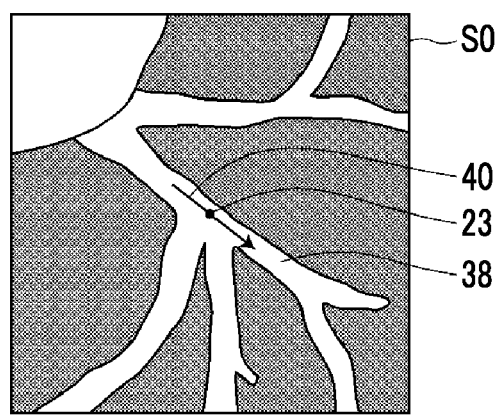
FIG. 16 is a diagram illustrating the direction of the blood vessel obtained by two-dimensional principal component analysis in a slice image of the reference cross-section.

When the direction parallel to the reference cross-section 25 is the target three dimensional direction, two-dimensional principal component analysis may be performed in an area in the vicinity of the three dimensional target point 23, using the cross-sectional image of the reference cross-section 25, to estimate the direction in which the structure having the three dimensional target point 23 set thereto is present in the reference cross-section 25 and the estimated direction may be used as the target three dimensional direction. For example, as shown in FIG. 16, in a cross-sectional image S0 of the reference cross-section 25, two-dimensional principal component analysis is performed in an area in the vicinity of the three dimensional target point 23. As a result, when a blood vessel 38 including the three dimensional target point 23 is present in the direction of an arrow 40, the direction of the arrow 40 is set as the target three dimensional direction. Therefore, it is possible to effectively align the observation direction of the blood vessel 38 with the target three dimensional direction.

In the above-described embodiment, the cross-sectional projection image P1 is displayed on the display 3. However, a projection image of a cross-section which is perpendicular to the reference cross-section 25 including the three dimensional target point 23 may be generated and displayed together with the cross-sectional projection image P1. In this case, it is easy to check the extension direction of the structure to which the three dimensional target point 23 is set. Therefore, it is possible to effectively determine the three dimensional direction of the three dimensional image V0.

In the above-described embodiment, the two-dimensional target point (three dimensional target point) is set to the tubular structure, such as a blood vessel or the trachea. However, the operator may set the target point to any desired structure.

In the above-described embodiment, the position of the point of view 20 is changed to rotate the reference cross-section 25. However, the point of view 20 may be fixed and the three dimensional image V0 may be rotated to rotate the reference cross-section 25.

What is claimed is:

1. A three dimensional orientation configuration apparatus comprising:
a processor configured to perform,
generating a two-dimensional projection image from a three dimensional image indicating a three dimensional object;
receiving the designation of a two-dimensional target point which is a target point on the projection image,
setting a three dimensional target point corresponding to the two-dimensional target point to the three dimensional image,
setting a reference cross-section to the three dimensional image on the basis of the three dimensional target point,
generating a cross-sectional two-dimensional image of the reference cross-section in which an object located on a point of view side of the reference cross-section included in the three dimensional image is not displayed, the point of view is located on a line that passes through the three dimensional target point and the line is perpendicular to the reference cross-section and the point of view faces the reference cross-section,
displaying the cross-sectional two-dimensional image on a display unit, and
generating the projection image, displaying the projection image, receiving the designation of the two-dimensional target point, setting the three dimensional target point, setting the reference cross-section, generating the cross-sectional two-dimensional image, displaying the cross-sectional two-dimensional image, receiving an instruction to change the position of a point of view, using the three dimensional target point based on the cross-sectional two-dimensional image as a reference point, in order to align an observation direction of a structure to which the three dimensional target point is set with a target three dimensional direction, sets a new reference cross-section on the basis of the changed position of the point of view, generating a new cross-sectional two-dimensional image of the new reference cross-section, and displaying the new cross-sectional two-dimensional image to determine a three dimensional direction for observing the three dimensional image.

2. The three dimensional orientation configuration apparatus according to claim 1,
wherein the processor further configured to perform, setting the three dimensional target point in the structure to which the two-dimensional target point is set.

3. The three dimensional orientation configuration apparatus according to claim 1,
wherein the processor further configured to perform, generating, as the cross-sectional two-dimensional image, a two-dimensional projection image of the three dimensional image in which the object located on the point of view side of the reference cross-section is not displayed.

4. The three dimensional orientation configuration apparatus according to claim 2,
wherein the processor further configured to perform, generating, as the cross-sectional two-dimensional image, a two-dimensional projection image of the three dimensional image in which the object located on the point of view side of the reference cross-section is not displayed.

5. The three dimensional orientation configuration apparatus according to claim 1,
wherein the processor further configured to perform, generating a cross-sectional image in the reference cross-section of the three dimensional image as the cross-sectional two-dimensional image.

6. The three dimensional orientation configuration apparatus according to claim 2,
wherein the processor further configured to perform, generating a cross-sectional image in the reference cross-section of the three dimensional image as the cross-sectional two-dimensional image.

7. The three dimensional orientation configuration apparatus according to claim 1,
wherein the processor further configured to perform, combining a cross-sectional image in the reference cross-section with a two-dimensional projection image of the three dimensional image in which the object locating the point of view side of the reference cross-section is not displayed to generate the cross-sectional two-dimensional image.

8. The three dimensional orientation configuration apparatus according to claim 2,
wherein the processor further configured to perform, combining a cross-sectional image in the reference cross-section with a two-dimensional projection image of the three dimensional image in which the object located on the point of view side of the reference cross-section is not displayed to generate the cross-sectional two-dimensional image.

9. The three dimensional orientation configuration apparatus according to claim 1,
wherein the processor further configured to perform, generating the cross-sectional two-dimensional image such that the three dimensional target point is located at the center.

10. The three dimensional orientation configuration apparatus according to claim 2,
wherein the processor further configured to perform, generating the cross-sectional two-dimensional image such that the three dimensional target point is located at the center.

11. The three dimensional orientation configuration apparatus according to claim 1,
wherein the processor further configured to perform, generating the cross-sectional two-dimensional image of an area in a predetermined range that has the three dimensional target point of the reference cross-section as a reference point.

12. The three dimensional orientation configuration apparatus according to claim 2,
wherein the processor further configured to perform, generating the cross-sectional two-dimensional image of an area in a predetermined range that has the three dimensional target point of the reference cross-section as a reference point.

13. The three dimensional orientation configuration apparatus according to claim 1, the processor further configured to perform,
calculating a coincidence between a pixel value on a line that extends from the three dimensional target point in the target three dimensional direction and a pixel value of the three dimensional target point in the three dimensional image and displays the coincidence on the display unit.

14. The three dimensional orientation configuration apparatus according to claim 1,
wherein the processor further configured to perform, setting the reference cross-section for generating an initial cross-sectional two-dimensional image so as to be perpendicular to a line connecting the point of view of the projection image and the three dimensional target point.

15. The three dimensional orientation configuration apparatus according to claim 1,
wherein the processor further configured to perform, performing principal component analysis for an area including the three dimensional target point in the three dimensional image to estimate a direction in which the structure having the three dimensional target point set thereto is present, and setting the reference cross-section on the basis of the estimated direction.

16. The three dimensional orientation configuration apparatus according to claim 1,
wherein, the processor further configured to perform, when the target three dimensional direction is parallel to the reference cross-section, capable of setting the target three dimensional direction to a desired direction on the reference cross-section.

17. The three dimensional orientation configuration apparatus according to claim 1,
wherein, the processor further configured to perform, when the target three dimensional direction is parallel to the reference cross-section, performing the principal component analysis for an area including the three dimensional target point in the reference cross-section of the three dimensional image to estimate the direction in which the structure having the three dimensional target point set thereto is present, and setting the target three dimensional direction on the basis of the estimated direction.

18. The three dimensional orientation configuration apparatus according to claim 1,
wherein the processor further configured to perform, receiving the instruction to change the position of the point of view and controlling such that the setting of the new reference cross-section, the generation of the new cross-sectional two-dimensional image, and the display of the new cross-sectional two-dimensional image are repeated, until the observation direction of the structure to which the three dimensional target point is set is aligned with the target three dimensional direction.

19. A three dimensional orientation configuration method using a computer comprising:
generating a two-dimensional projection image from a three dimensional image indicating a three dimensional object;
receiving the designation of a two-dimensional target point which is a target point on the projection image;
setting a three dimensional target point corresponding to the two-dimensional target point to the three dimensional image;
setting a reference cross-section to the three dimensional image on the basis of the three dimensional target point;
generating a cross-sectional two-dimensional image of the reference cross-section in which an object located on a point of view side of the reference cross-section included in the three dimensional image is not displayed, the point of view is located on a line that passes through the three dimensional target point and the line is perpendicular to the reference cross-section and the point of view faces the reference cross-section;
displaying the cross-sectional two-dimensional image on the display unit;
receiving an instruction to change the position of the point of view, using the three dimensional target point based on the cross-sectional two-dimensional image as a reference point, in order to align an observation direction of a structure to which the three dimensional target point is set with a target three dimensional direction;
setting a new reference cross-section on the basis of the changed position of the point of view;
generating a new cross-sectional two-dimensional image of the new reference cross-section; and
displaying the new cross-sectional two-dimensional image to determine a three dimensional direction for observing the three dimensional image.

20. A non transitory computer readable medium storing a three dimensional orientation configuration program, the program causes a computer to perform:
a process of generating a two-dimensional projection image from a three dimensional image indicating a three dimensional object;
a process of receiving the designation of a two-dimensional target point which is a target point on the projection image;
a process of setting a three dimensional target point corresponding to the two-dimensional target point to the three dimensional image;
a process of setting a reference cross-section to the three dimensional image on the basis of the three dimensional target point;
a process of generating a cross-sectional two-dimensional image of the reference cross-section in which an object located on a point of view side of the reference cross-section included in the three dimensional image is not displayed, the point of view is located on a line that passes through the three dimensional target point and the line is perpendicular to the reference cross-section and the point of view faces the reference cross-section;
a process of displaying the cross-sectional two-dimensional image on the display unit;
a process of receiving an instruction to change the position of the point of view, using the three dimensional target point based on the cross-sectional two-dimensional image as a reference point, in order to align an observation direction of a structure to which the three dimensional target point is set with a target three dimensional direction;
a process of setting a new reference cross-section on the basis of the changed position of the point of view;
a process of generating a new cross-sectional two-dimensional image of the new reference cross-section; and
a process of displaying the new cross-sectional two-dimensional image to determine a three dimensional direction for observing the three dimensional image.

* * * * *